(12) United States Patent
Wygnanski

(10) Patent No.: US 6,935,373 B2
(45) Date of Patent: Aug. 30, 2005

(54) ELECTRO-MAGNETICALLY OPERABLE DEVICE

(75) Inventor: Wladyslaw Wygnanski, Cambridge (GB)

(73) Assignee: Camcon, Ltd., Cambridge (GB)

( * ) Notice: Subject to any disclaimer, the term of this patent is extended or adjusted under 35 U.S.C. 154(b) by 8 days.

(21) Appl. No.: 10/311,783

(22) PCT Filed: Jul. 5, 2001

(86) PCT No.: PCT/GB01/02979

§ 371 (c)(1),
(2), (4) Date: Apr. 1, 2003

(87) PCT Pub. No.: WO02/04851

PCT Pub. Date: Jan. 17, 2002

(65) Prior Publication Data

US 2003/0168112 A1 Sep. 11, 2003

(30) Foreign Application Priority Data

Jul. 6, 2000 (GB) .............................. 0016505

(51) Int. Cl.$^7$ ................................ F16K 1/16
(52) U.S. Cl. .................... 137/625.44; 251/65; 335/234; 335/273
(58) Field of Search ...................... 137/625.44; 251/65; 335/234, 273

(56) References Cited

U.S. PATENT DOCUMENTS 1,552,676 A * 9/1925 Carpenter et al. .......... 335/230
2,036,277 A   4/1936 Johnson
3,631,366 A * 12/1971 Ugon .......................... 335/82
5,711,346 A   1/1998 Pieloth

FOREIGN PATENT DOCUMENTS

| CH | 339368 | 8/1959 |
|----|--------|--------|
| DE | 386419 | 12/1923 |
| DE | 3222893 A1 | 12/1983 |
| FR | 697174 | 1/1931 |

* cited by examiner

Primary Examiner—John Fox
(74) Attorney, Agent, or Firm—Barnes & Thornburg

(57) ABSTRACT

An electro-magnetically operated device is described in which a magnetisable armature, typically a length of thin naturally resilient mild steel, is sandwiched between, and extends from, two parts of a magentic circuit which contains an air gap into which the armature extends. An electromagnet polarizes the armature along its length so as to cause the end thereof in the air gap to be attached to one or the other of the two poles of the magnetic circuit defining the gap. The armature is designed so as to be capable of adopting a mid-position between the poles of the air gap if the curent flowing in the electromagnet is reduced to zero. Equalising the air gaps and adjusting the size of the gap relative to the resilience of the armature will produce a bistable characteristic in which the armature will not remain in the mid-position, but will always remain in contact with one pole or the other, and is shifted from one to the other by a pulse of current of appropriate polarity. Adjustment of the size of the air gap on one side or the other of the armature introduces an out of balance in the magnetic circuit enabling the device to adopt a monostable characteristic instead of a bistable characteristic.

16 Claims, 14 Drawing Sheets

OPTION 2 (TWIST-SIDE)

VALVE PORTS AT 90°
TO VALVE ROCKERS

SECTION X-X

OPTION 1 (TWIST-TIGHT)

SECTION Z-Z

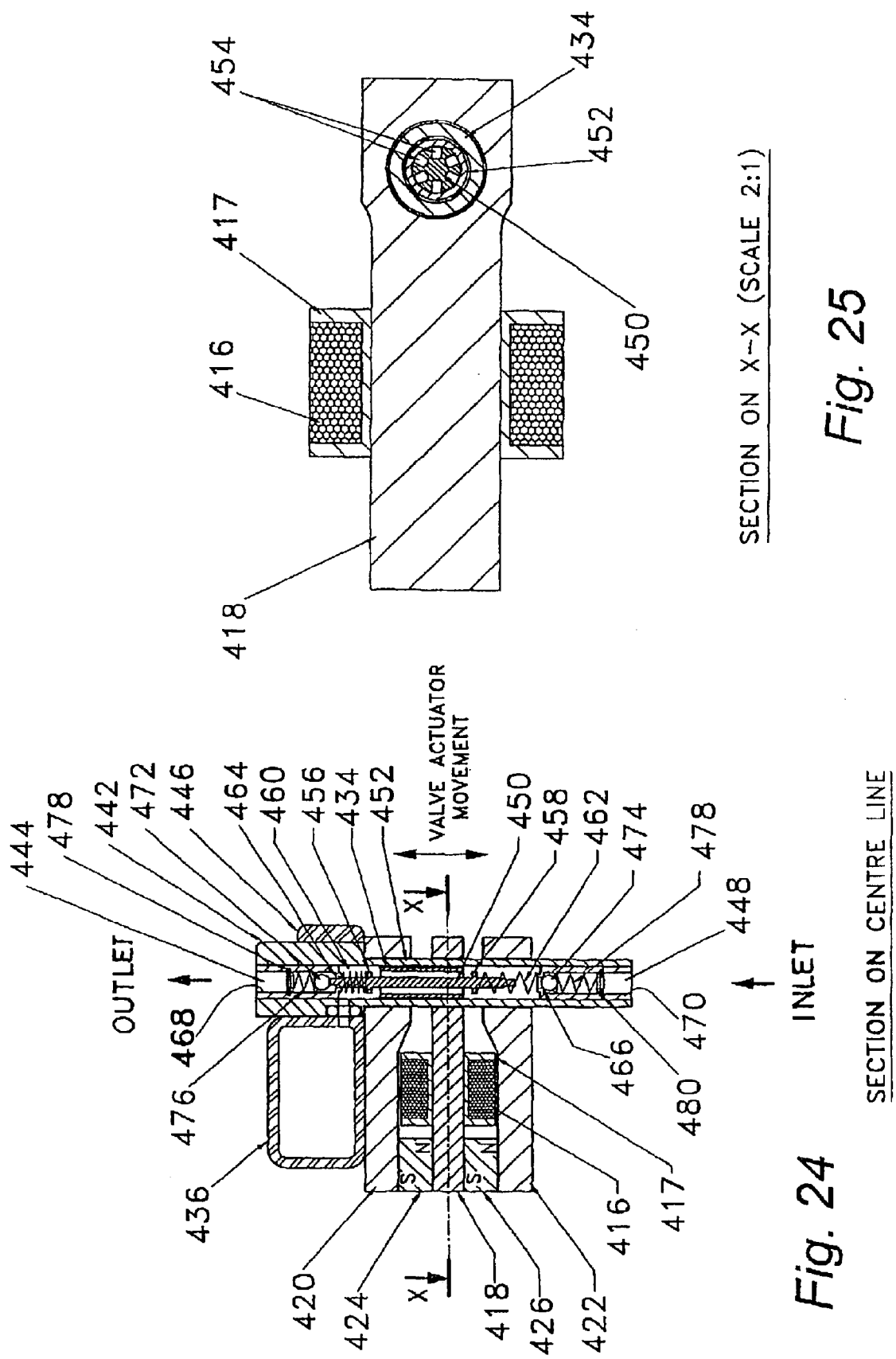

ELECTRO-MAGNETICALLY OPERABLE DEVICE

FIELD OF INVENTION

This invention concerns electromagnetically operative devices (actuators) of the type which use a magnetic field to move an armature from one position to another.

BACKGROUND TO THE INVENTION

Such actuators can be used to control switch contacts and provide either a normally open, normally closed or changeover functionality, by attaching one or more contacts to the armature or using the movement of the armature to move another member carrying the contact(s). Similarly movement of the armature can open and/or close valves controlling a flow of fluid.

Many such devices require a continuous flow of electric current to hold the armature in one position or the other. This is wasteful of energy and can produce unwanted heat.

It is an object of the present invention to provide such a device with a bistable characteristic where the change in position of the armature is effected by means of a single pulse and the armature remains in the new position until a pulse of opposite polarity is received.

It is a further object of the invention to provide such a device in which the bistable operating characteristic can be converted to a monostable characteristic.

SUMMARY OF THE INVENTION

According to the present invention, an electromagnetically operable device comprises:

(a) a magnetic circuit having permanent N and S poles defining an air gap;

(b) an armature assembly which extends into the air gap and at least a portion of which is magnetisable and is movable between two end positions adjacent the two permanent poles through an intermediate position towards which it is resiliently biased; and (c) an electromagnet which when energised by an electric current polarises the magnetisable portion of the armature assembly so that the part thereof in the air gap becomes a S or N pole and will thereby be attracted towards one of the permanent poles.

In a preferred arrangement which will possess a bistable characteristic, the residual permanent flux linking the magnetic part of the armature assembly and the relevant adjacent permanent pole after a current of a given magnitude and direction has flowed in the electromagnet and displaced the armature, is sufficient to generate a force of attraction which is greater than the resilient force acting to return the armature to its intermediate position so as to retain the armature in its displaced position, but which is less than the sum of the resilient force and the force of attraction created by the magnetic flux linking the magnetic part of the armature assembly and the other permanent pole, when a similar current, but flowing in the opposite direction, flows in the electromagnet.

In such an arrangement, a pulse of current in one direction will cause the armature assembly to move to, and remain at one end of its travel and a pulse of current of similar magnitude but opposite direction, will cause it to move to, and remain at, the other end of its travel.

The armature assembly may be formed in part from a length of resilient material and the resilient force is generated by deflecting the resilient material from an undeflected condition, to one side or the other.

Thus in one embodiment of the present invention, an electromagnetically operated device comprises a naturally resilient magnetisable armature sandwiched between two parts of a magnetic circuit which contains an air gap into which the armature extends, and an electromagnet is provided to magnetically polarize the armature along its length to cause the end of the armature in the air gap to be attracted to one or the other of the two poles of the circuit defining the gap.

Preferably the armature is adapted to occupy the air gap with an equal distance between it and each of the two poles when relaxed, so that if the magnetic flux is reduced to zero the armature is equally spaced from both poles.

The closure of the gap by the movement of the armature towards one of the poles increases the flux linking the armature and that one pole, and by selecting the resilience of the armature material so that the tendency of the armature to resume a mid position between the poles is less than the magnetic force acting between it and the said one pole to which it has moved, the armature will remain in position near or in contact with the said one pole.

The pole to which the armature is attracted is selected by causing a direct current to flow through the winding of the electromagnet coil in one direction or the other. Current in one direction will move die armature towards one of the poles and in the other direction it will move the armature towards the other of the two poles.

Typically the armature is a straight elongate strip of mild steel, part of the length of which is sandwiched between the two parts of the magnetic circuit and the unsupported remainder of which extends at least in part between the two poles.

Such an armature can be considered to hinge about a point along its length from where it protrudes from two parts between which it is secured and which make up the magnetic circuit, and the faces of the poles are preferably inclined so as to be parallel to the length of the armature which extends beyond the hinge point to its free end, and which by virtue of the hinging action, becomes angled relative to the remainder of the armature.

By ensuring good face to face contact between the armature and one of the two poles, and providing an opening in that pole which is covered by the armature when the latter is attracted to it, and opened when the armature either occupies its intermediate position or is attracted to the other pole, the armature can be used to control the flow of fluid (liquid or gas) through the opening.

By providing an opening in the other pole, this other opening will be will be covered by the armature when it is attracted to this said other pole and vice versa.

If an opening is to be sealingly closed by the armature, an appropriate seal may be provided around the edge of the opening, to be engaged by the face of the armature. A suitable sealing material may instead, or in addition, be included on the face of the armature.

If a monostable characteristic is desired, means may be provided to increase the air gap between the armature and one of the pole faces, so that when a current flows through the electromagnet which would have attracted the armature to that pole, the flux linking the armature and that pole is insufficient even when combined with the resilient force, to generate the force of attraction needed the overcome the force of attraction between the armature and the other pole due to the residual permanent flux linking the armature and the said other pole.

The size of the air gap between the armature and each of the poles is preferably adjustable to enable the magnetic circuit to be balanced.

The adjustment may be by way of a movable insert which may be magnetisable and which can be adjusted so as to protrude to a greater or lesser extent from a pole face.

The device may be linked to a parameter sensing means for adjusting the position of one pole relative to the mid position of the armature, so as to increase the distance between the armature and that pole if the parameter sensed by the sensing means exceeds a predetermined value—eg. Temperature becomes elevated or pressure rises.

In another arrangement, the armature assembly may be slidable in a guide between the two end positions it can adopt depending on the direction in which the current last flowed in the electromagnet, and the latter has a core which is magnetically coupled to the magnetisable part of the armature assembly.

In such an arrangement the core conveniently extends into the air gap between the permanent N and S poles and at least in part surrounds a movable and magnetisable part of the armature assembly.

In another arrangement the armature assembly may comprise a wedge of magnetisable material which is located in a V-shaped gap between two faces of magnetisable material which are permanently magnetised as N and S poles, the included angle of the armature wedge being less than the angle between the two faces of the V-shaped gap, so that the armature dan rock in the gap between two end positions, one in which it engages the face at one end of the gap and the other in which it engages the face at the other end of the gap, a spring acts on the wedge to bias it into a mid-position between the two faces, and an electromagnet is coupled to the armature to cause the armature to become a N or a S pole so that it is attracted to one and repelled from the other of the two faces defining the gap.

In one arrangement, two permanent magnets are arranged in series with a block of magnetisable material sandwiched between the N pole of one and the S pole of the other, and pole faces extend from the S pole of the one, and the N pole of the other magnet, to define the S and N poles of the gap and the electromagnet generates a flux which links the block of magnetisable material between the two magnets and the wedge shaped armature.

In another arrangement, a single permanent magnet may be employed, arranged transversely and symmetrically relative to the mid-position of the armature wedge, with pole pieces extending therefrom to define the V-shaped air gap, and the electromagnet is arranged with its magnetic axis transverse to that of the permanent magnet.

In a further arrangement, pole pieces are arranged to extend symmetrically in opposite directions from the ends of the single permanent magnet to define two V-shaped air gaps, back to back, on opposite sides of the permanent magnet, and two wedge shaped armatures are provided, one in each gap and each pivotable in the gap as described above, and the electromagnet has pole pieces which influence the two armatures so that if one is a N pole tile other will comprise a S pole.

In each of the arrangements, movement of the or each armature assembly (or part thereof) can be arranged to cover or uncover openings, so as to permit or impede a fluid flow.

Since the armature will be attracted to opposite poles of the two V-shaped air gaps, the two armatures can be likened to opposite ends of a see-saw. Both can be adapted to cover and uncover ports to control fluid flow if desired. One or both may be visible in a window to indicate the position it has adopted in the slot.

One or both may for example be coloured and adapted to move relative to a window so as to present a different region in the window depending on its position, and two coloured regions may be provided on the or each armature.

In another arrangement one may be adapted to cover and uncover ports to control fluid flow and the other is merely employed as an indicator of the position of the former.

The invention also lies in a fluid flow control valve operated by movement of an armature in any device as herein described.

The invention will now be described by way of example with reference to the accompanying drawings, in which FIG. 1 is a cross-section through a bistable electromagnetic drive embodying the invention;

Figure 9A:
FIG. 9 is a section through another actuator embodying the invention.
Figure 9:
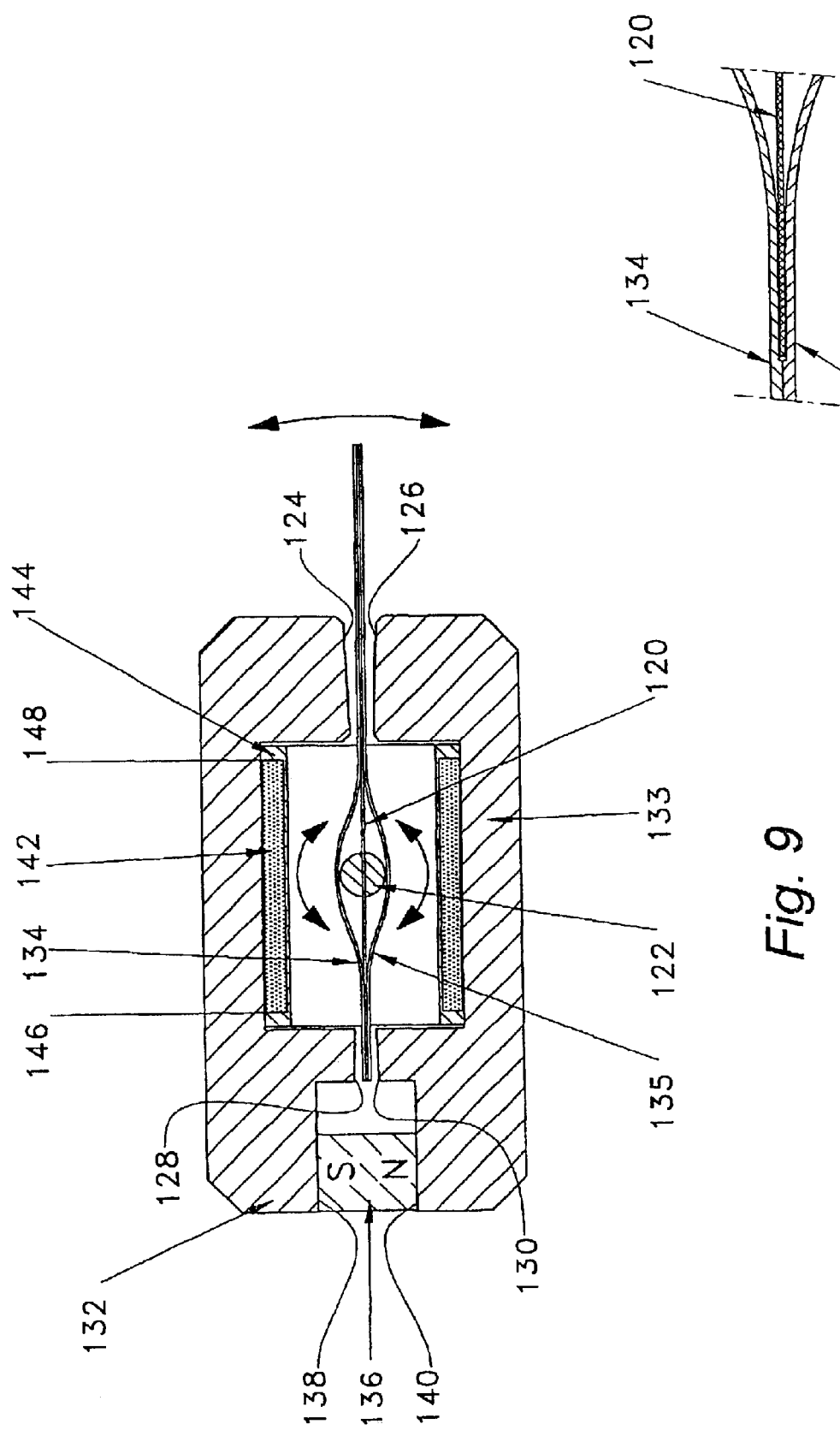
Figure 10:
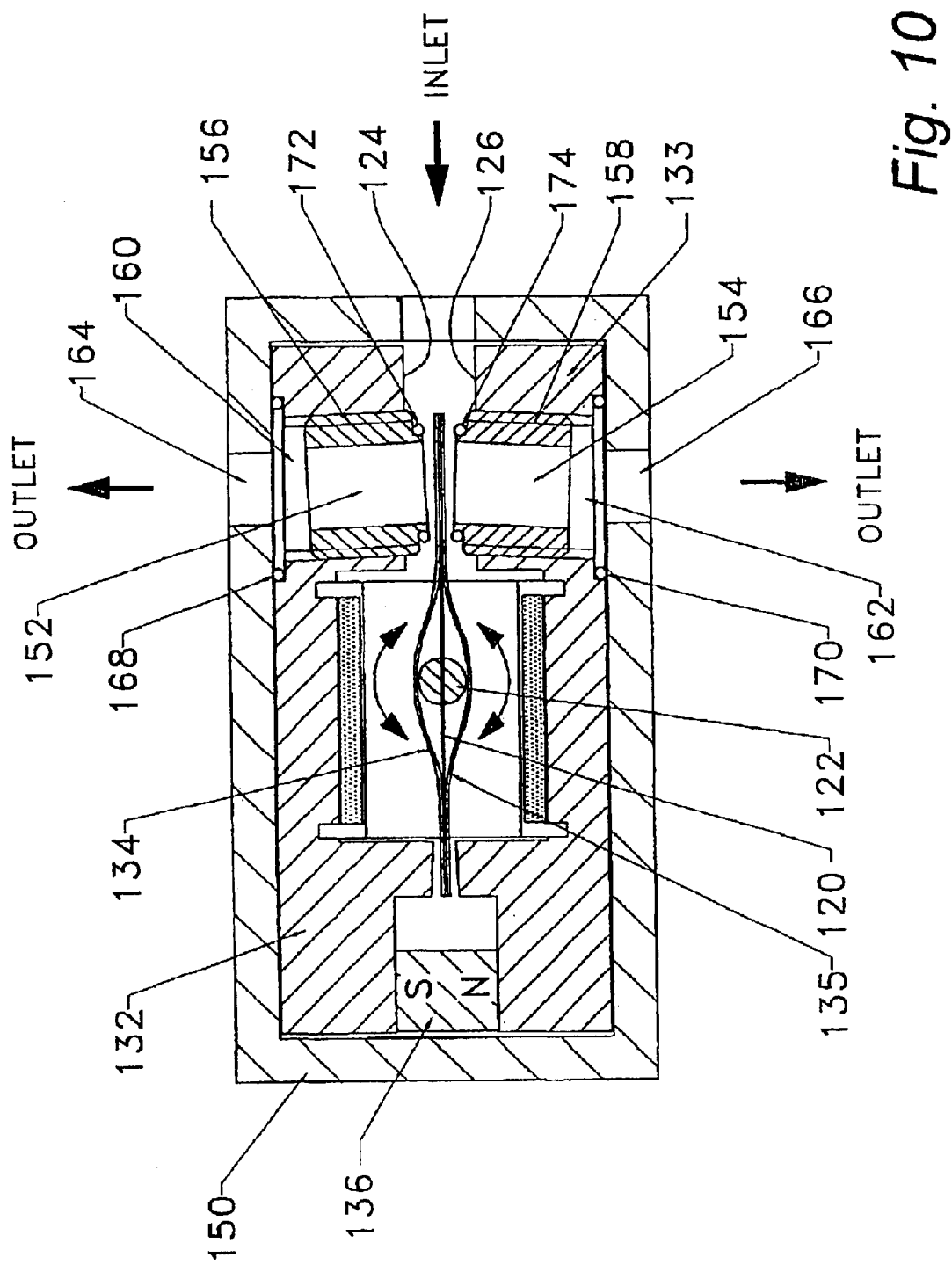
Figure 11:
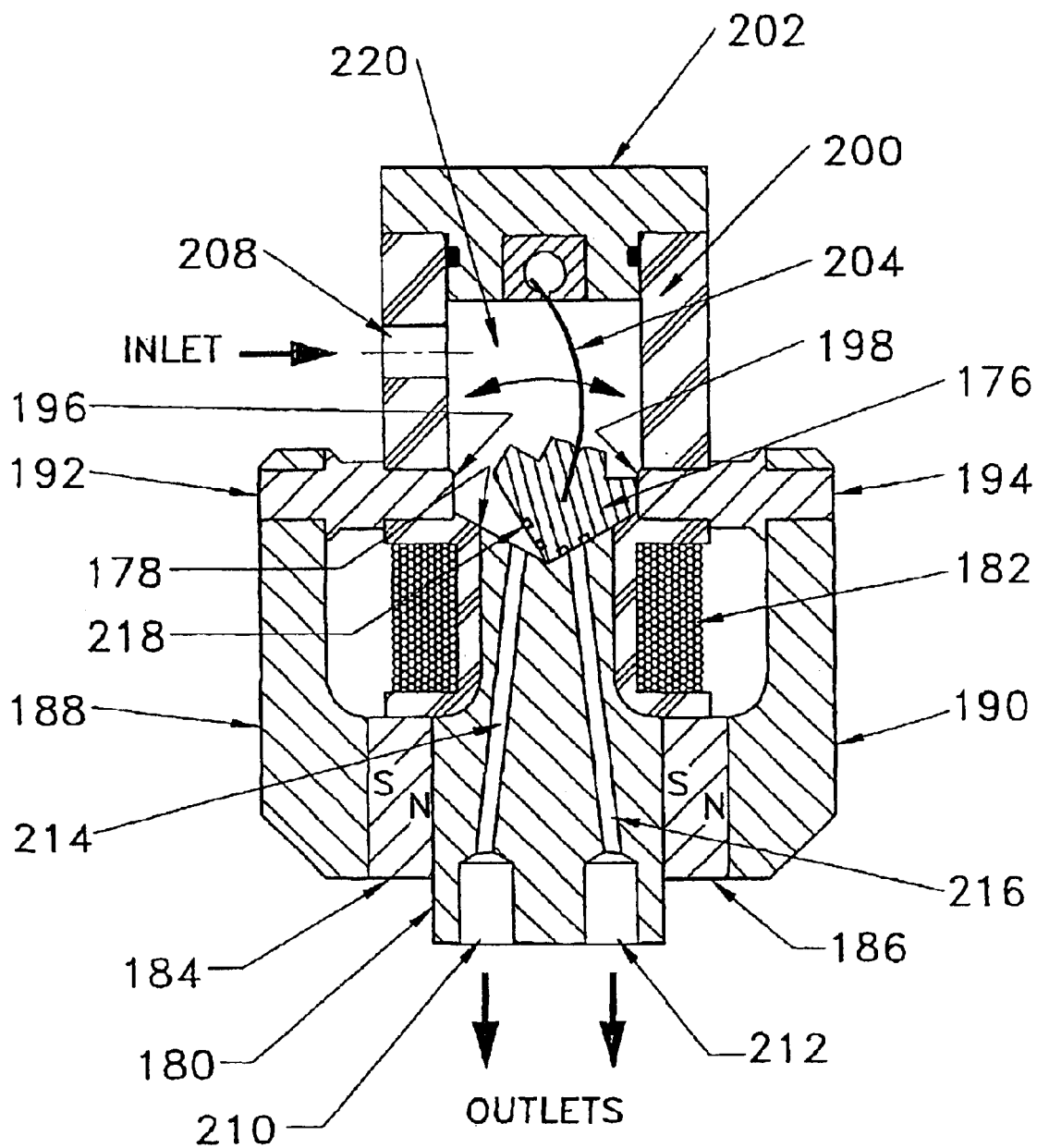
Figures 12, 13:
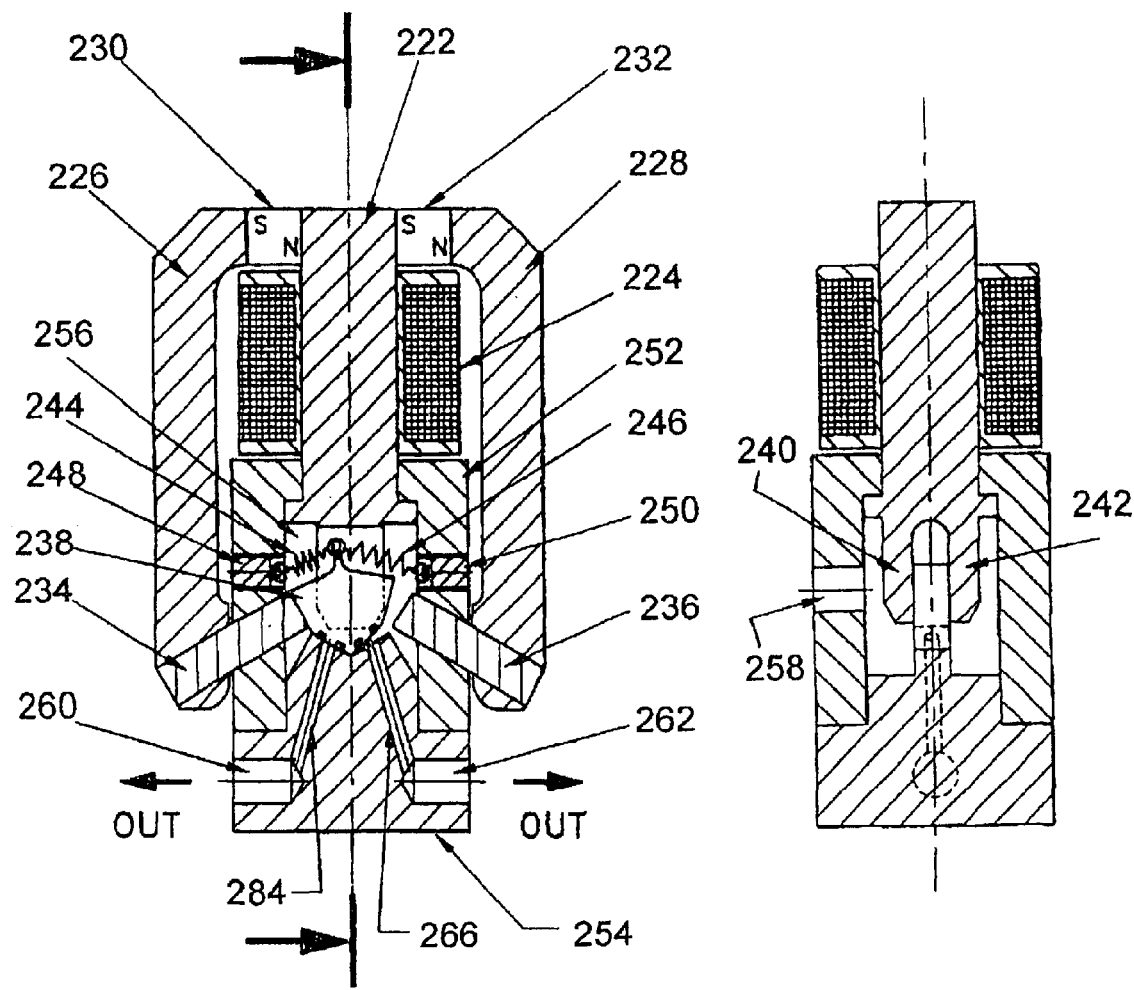
Figure 14:
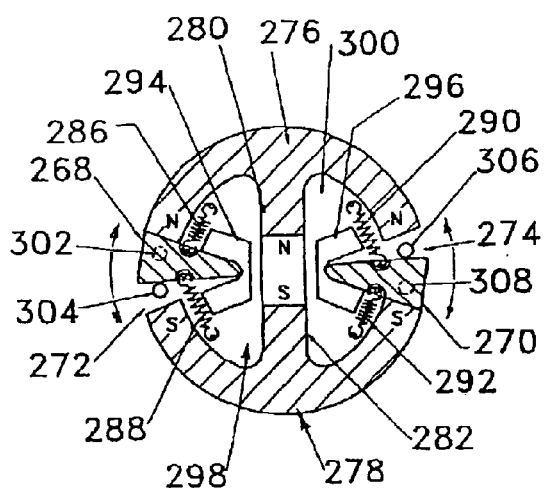
Figure 15:
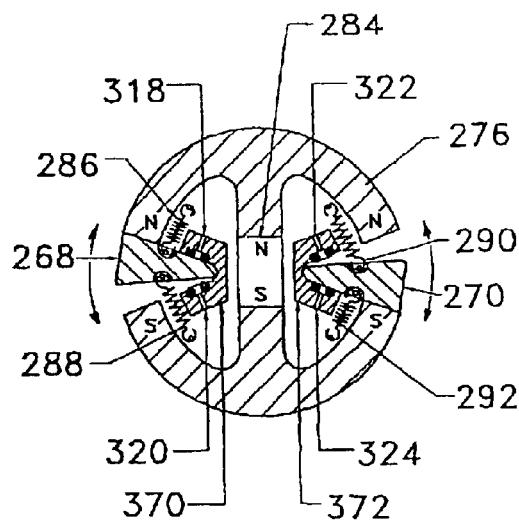
Figure 16:
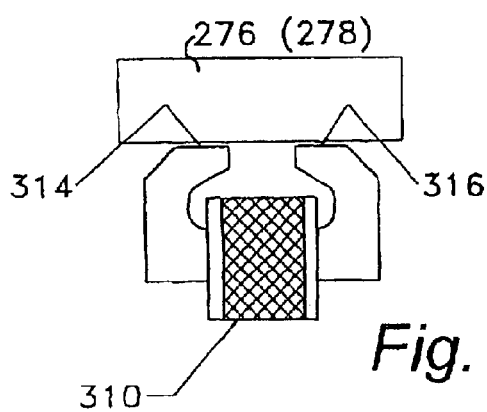
Figure 17:
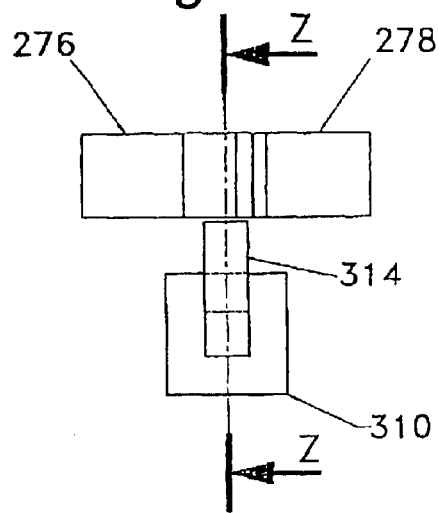
Figure 18:
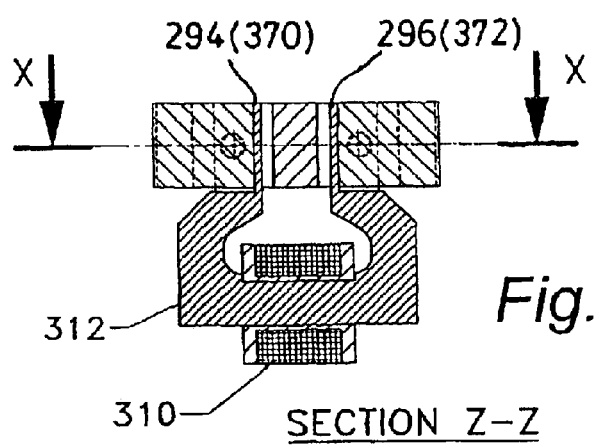
Figure 19:
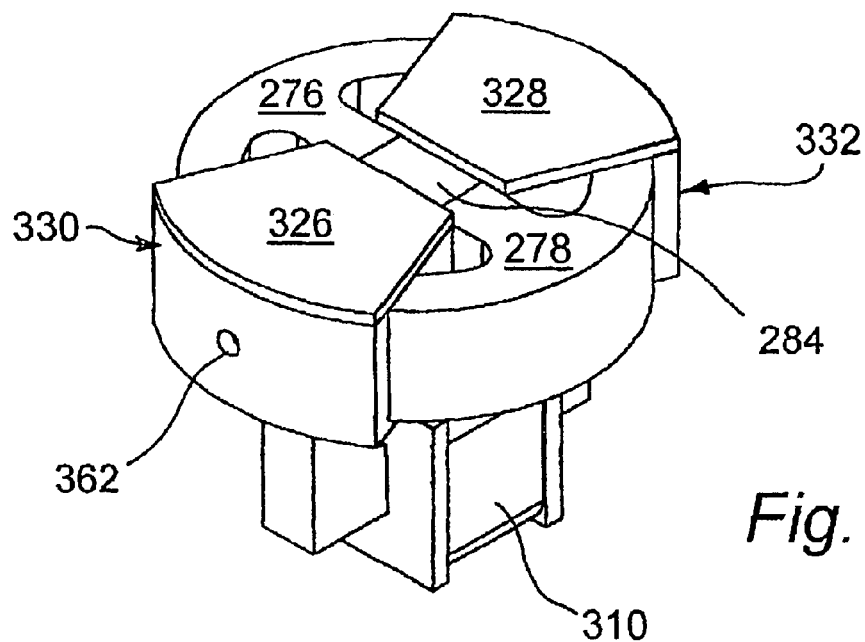
Figure 20:
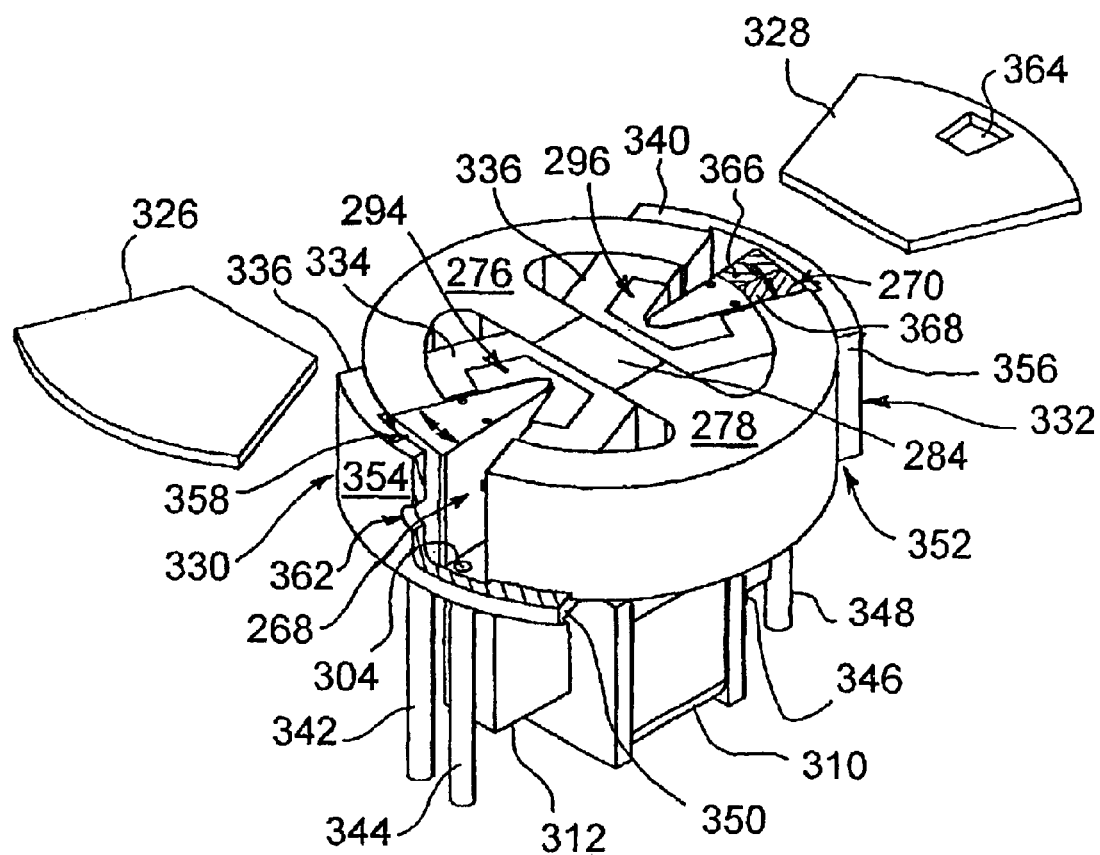
Figure 21:
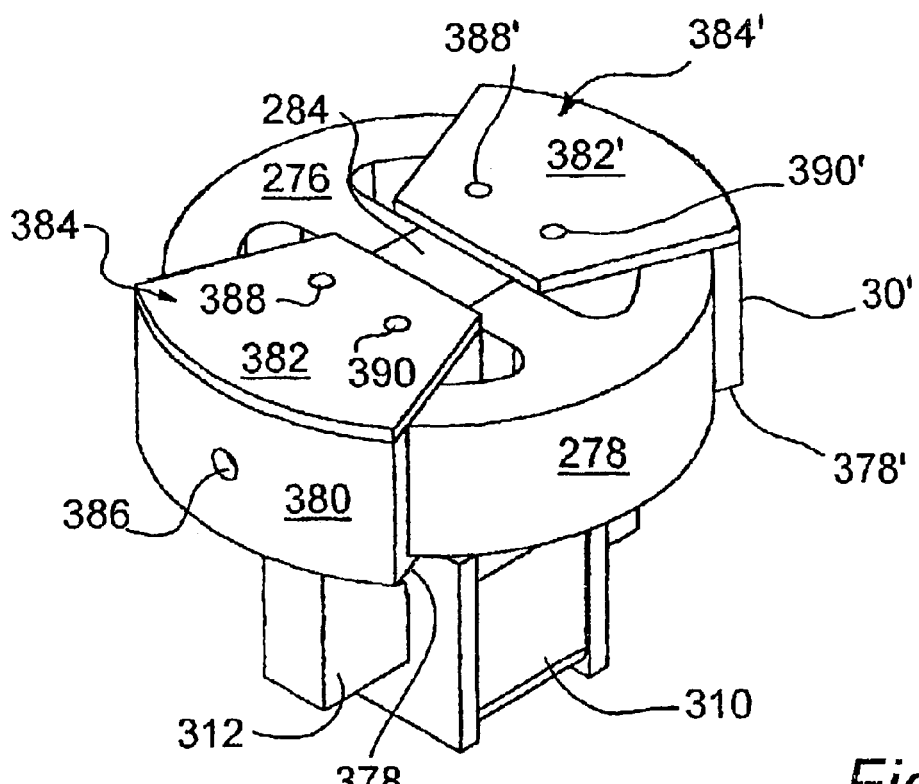
Figure 22:
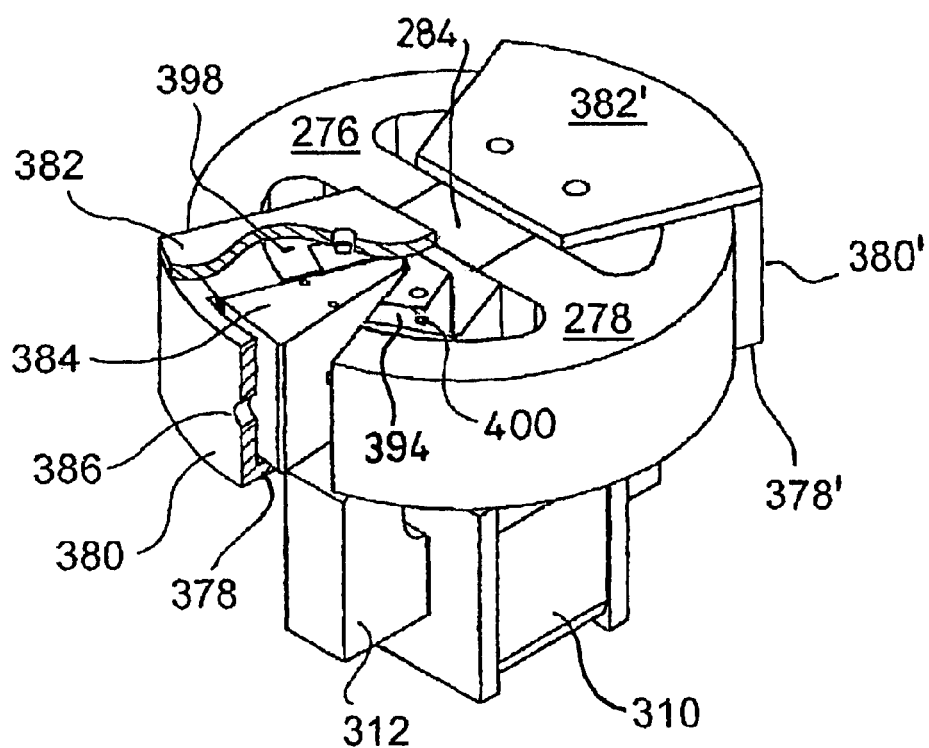
Figure 23:
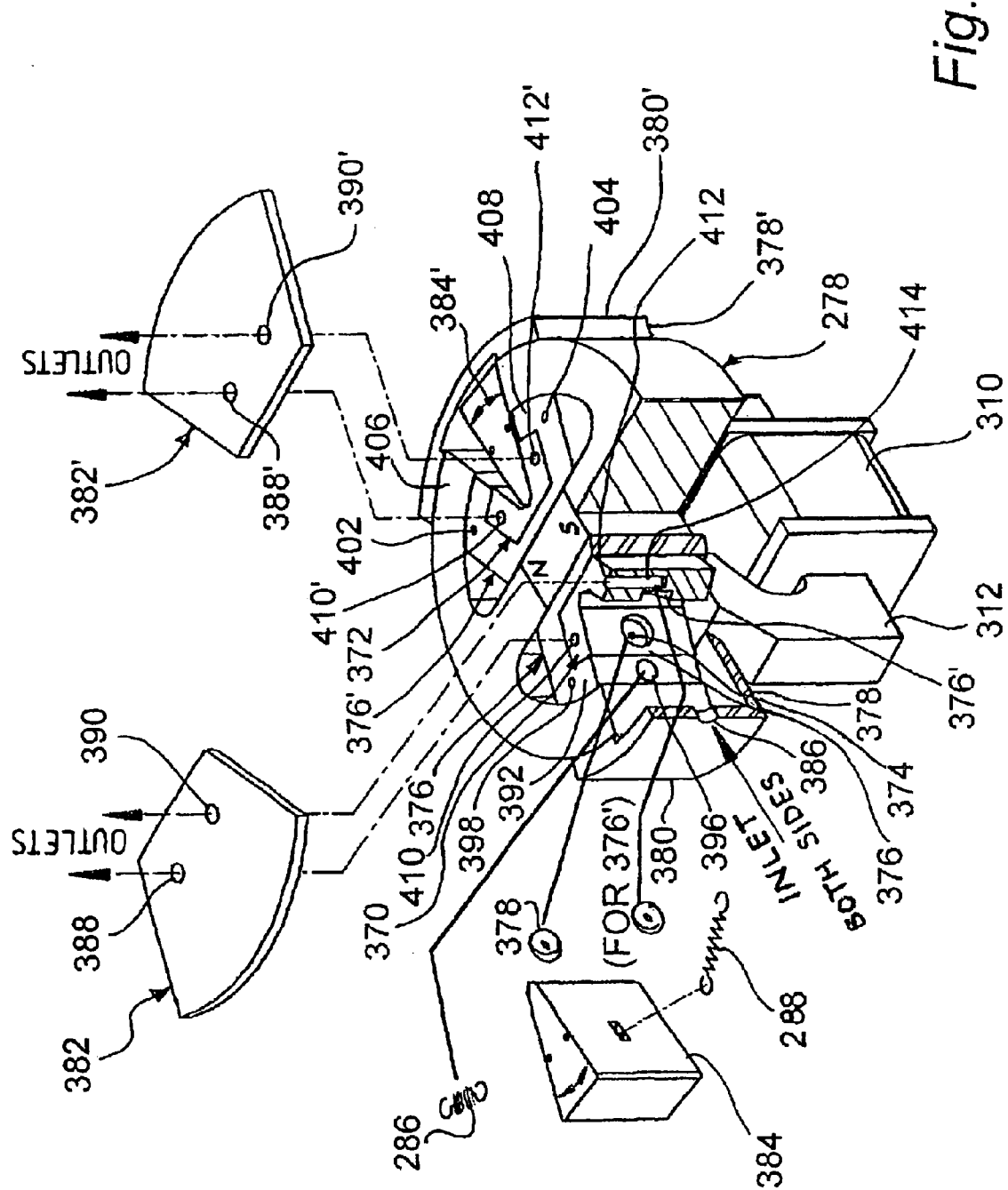
Figure 26:
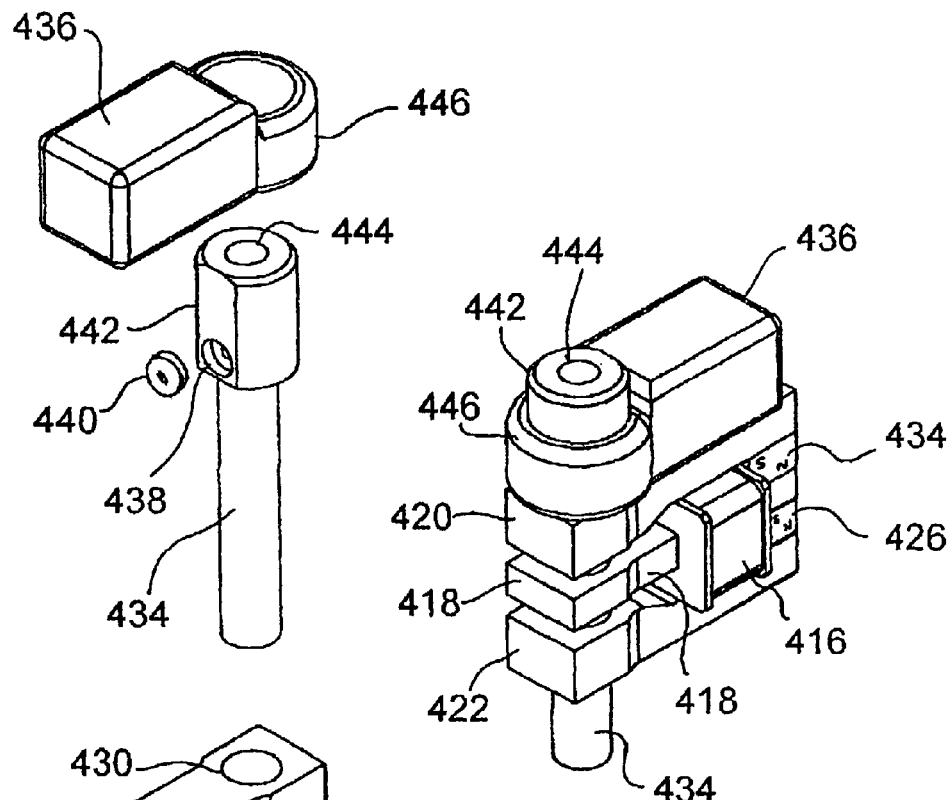
Figure 27:
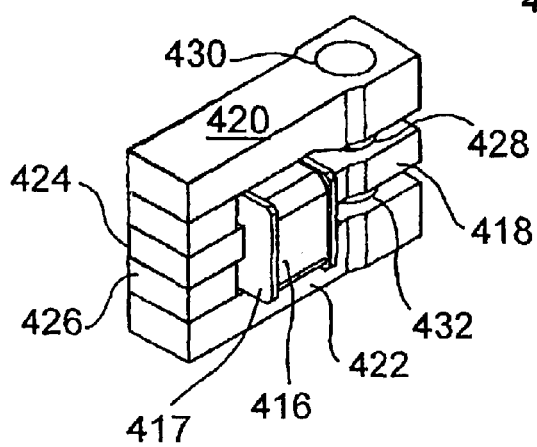

FIG. 10 is a section through a fluid flow control valve incorporating an actuator of the type shown in FIG. 9, FIG. 11 is a section through a fluid flow control valve incorporating another actuator embodying the invention, FIGS. 12 and 13 are sections through another fluid flow control valve incorporating a variation of the type of actuator shown in FIG. 11, FIG. 14 is a cross-section through another actuator embodying the invention (with the electromagnet omitted), and shows how the end faces of the armatures can be used to cover/uncover ports to control fluid flow if desired, FIG. 15 is a cross-section through an actuator similar to that shown in FIG. 14 (again with the electromagnet omitted), but in which the ports are covered and uncovered by side faces of the armature, FIG. 16 is a top plan view and FIG. 17 a side view of an actuator such as shown in FIG. 14 or 15, showing how an electromagnet can be mounted adjacent one side face of the assembly to magnetically polarise the armatures, FIG. 18 is a cross-section on 22 of FIG. 17 to show how in an alternative arrangement to what is shown in FIGS. 16 and 17, the electromagnet poles can be adapted to enter the actuator assembly to increase the flux linkage with the armature components, FIG. 19 is a perspective view of an actuator and electromagnet assembly such as illustrated in FIG. 14 using a modified electromagnet pole arrangement of FIG. 18, FIG. 20 is a partly exploded, partly cutaway perspective view of the device shown in FIG. 19, FIG. 21 is a perspective view of an actuator and electromagnet assembly such as illustrated in FIG. 15 using the modified electromagnetic pole arrangement of FIG. 18, FIG. 22 is a partly cutaway perspective view of the device shown in FIG. 21, FIG. 23 is a partly exploded, partly cut-away view of the device shown in FIGS. 21 and 22, FIG. 24 is a cross-section through a further fluid flow control valve incorporating another actuator embodying the invention, FIG. 25 is a section on the line XX in FIG. 24, to an enlarged scale, FIG. 26 is a perspective view of the device shown in section in FIG. 24, and FIG. 27 is an exploded perspective view showing some of the components making up the assembly of FIG. 26.

Figure 1:
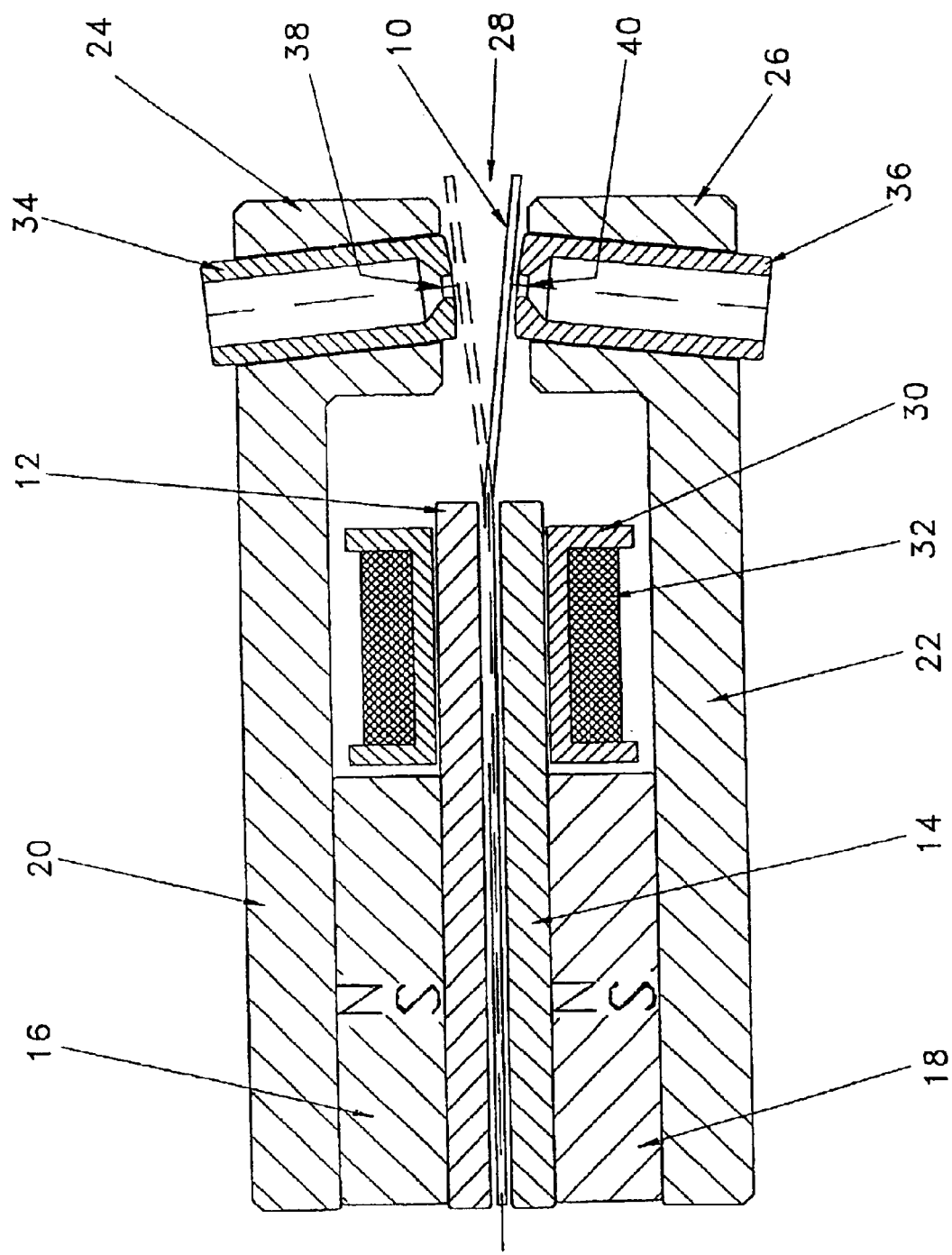

In FIG. 1 a linear armature of flat spring steel 10 is sandwiched between two internal pole pieces of mild steel 12, 14 which are themselves sandwiched between two permanent magnets 16, 18. Two external mild steel members 20, 22 extend beyond the end of the sandwich of magnets and internal pole pieces 12–18 and armature 10, and at their remote ends provide two inwardly facing poles 24, 26 defining an air gap 28 between which in its undeflected state the armature 10 extends equidistant from the two poles 24, 26.

The internal pole pieces 12, 14 extend beyond the permanent magnets 16, 18 where they are surrounded by a coil former 30 on which a coil 32 is wound.

Two cylindrical inserts 34, 36 are fitted in the poles 24, 26 and the opposed inner ends of the inserts are closed except for orifices 38, 40. The inserts are of magnetisable material.

The armature can be deflected under the magnetic field induced by a current flowing in the coil 32 and depending on the direction of current flow in the coil, the armature will be attracted towards the pole 26 and insert 36 as shown in solid outline, or towards the other pole 24 and insert 34, as shown in dashed outline.

The inserts 34, 36 are mounted with their axes at an angle of less than 90° to the faces of the poles 24, 26 so that the opposed end faces of the inserts are parallel to the armature when the latter is deflected towards the poles. In this way a flat face of the armature can co-operate with the inwardly directed inclined face of insert 34 or 36, to close off orifice 38 or 40, respectively.

Each insert protrudes by a small distance beyond its pole face and is adjusted axially to create the desired air gap to the armature. The armature remains attracted to the pole towards which it was last deflected by the magnetic flux created by a current flowing in the coil, due to the closure of the gap concerned and the flux remaining due to the permanent magnets 16, 18. The orifice in that pole insert thus remains closed off until such time as a current flows in the opposite sense in the coil, whereupon the armature will rapidly shift to the other pole, and in a similar manner remain attracted towards this other pole until a suitable current once again is caused to flow in the coil, to reverse the deflection of the armature once again. While deflected towards this other pole, the orifice in that pole-insert will be closed off by the armature, leaving the orifice in the insert in the first pole uncovered.

When constructed in this balanced way, the armature can be said to be bistable—in that it will remain in either position until prompted to adopt its other stable state. More importantly by selecting the strength of the magnets, the size of the air gaps between the armature and inserts as determined by the amount by which the inserts protrude beyond the faces of the pole pieces, and the resilience of the armature,—the armature will remain in its last deflected condition even after the current causing that deflection has ceased to flow in the coil. The device can therefore be switched from one state to the other ( ie from one orifice closed and the other open to one in which the one orifice is open and the other is closed), by pulses of electric current of appropriate magnitude and polarity, as dictated by the number of turns in the coil and the direction in which the wire is wound to form the coil.

Figure 2:
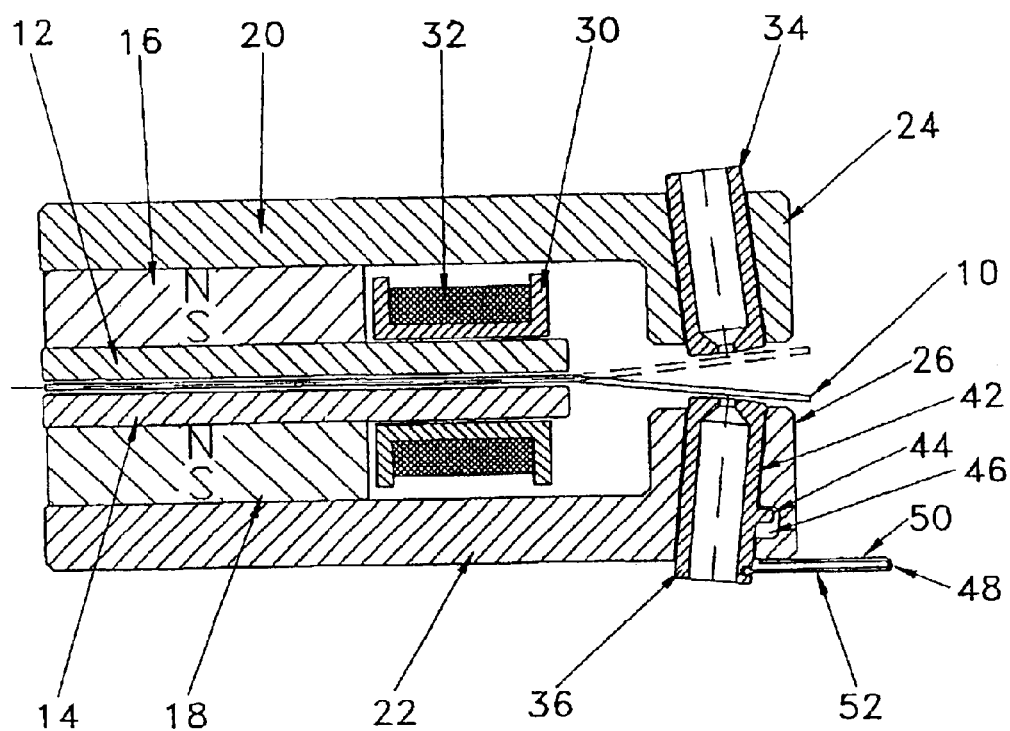
FIG. 2 is a cross-section through a bistable electromagnetic drive modified to act as a safety valve.
Figure 3:
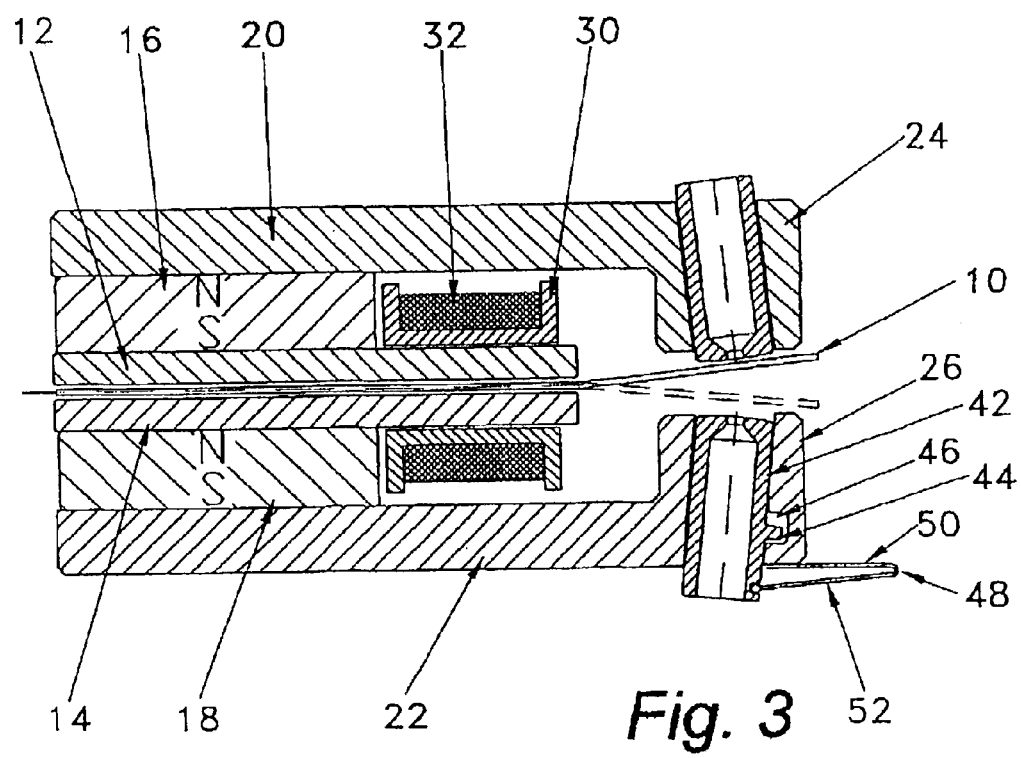
FIG. 3 is a cross-section through the electromagnetic drive of FIG. 2 in which the bistable function has been modified to a monostable function by operation of a bi-metal device.

The modification of FIGS. 2 and 3 allows this balanced form of condition to be changed in response to an external influence. This can be any device which alters the amount by which one of the inserts protrudes beyond the end of the pole piece in which it is mounted, relative to the other.

To this end insert 36 of FIG. 1 is replaced by insert 42 (see FIGS. 2 and 3) which can be slid relative to the pole 26 within the limits defined by the engagement of a radial protrusion 44 into a cavity 46 in the wall of the bore in which the insert is fitted.

The actual position of the insert is governed by the condition of a bi-metal hairpin device 48 one limb of which is rigidly attached to the pole 26 and the other of which is hinged to the protruding end of the insert 36. At low temperatures the limbs of the bi-metal device remains tightly closed (as shown in FIG. 2) but at elevated temperatures the limbs splay apart (as shown in FIG. 3). In doing so, the insert 36 is moved axially relative to the pole 26 so that the internal end containing the orifice 40 is shifted into alignment with the end face of the pole 26.

In this condition the air gap between insert 36 and armature 20 is much greater than that between the armature and insert 34, and a current pulse normally able to shift the armature from pole 24 to pole 26, will not be able to generate sufficient flux in the larger air gap between 10 and 36 to overcome the magnetic attraction between 10 and 34. The device will thus remain with the armature deflected towards 24 and closing off orifice 38.

The device thus now has a fail safe characteristic in that at elevated temperatures, for example, a current pulse which would normally open orifice 38 is unable to attract the armature away from pole 24, so that orifice 38 remains closed, until the temperature of the bi-metal device 48 drops and allows the two limbs to close and shift the insert 36 back into its protruding position (similar to 34).

Figure 6:
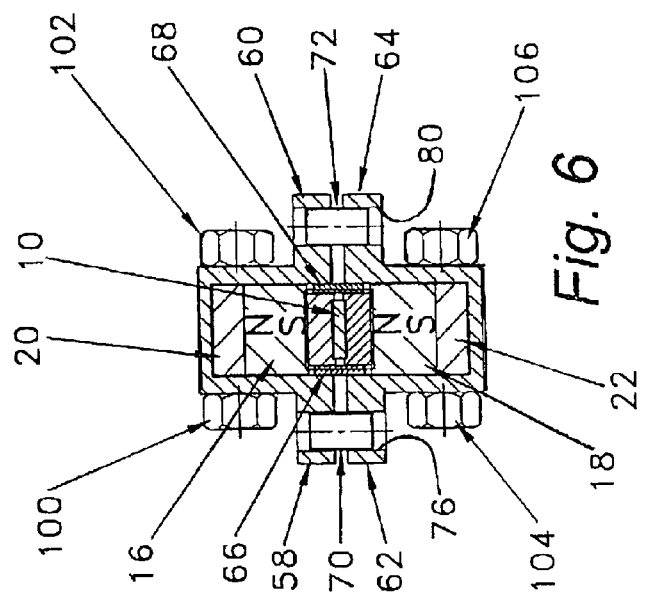
FIGS. 4,5 and 6 are a part sectioned plan view, side view and end view respectively of one embodiment of an electromagnetic drive embodying the invention.
Figure 4:
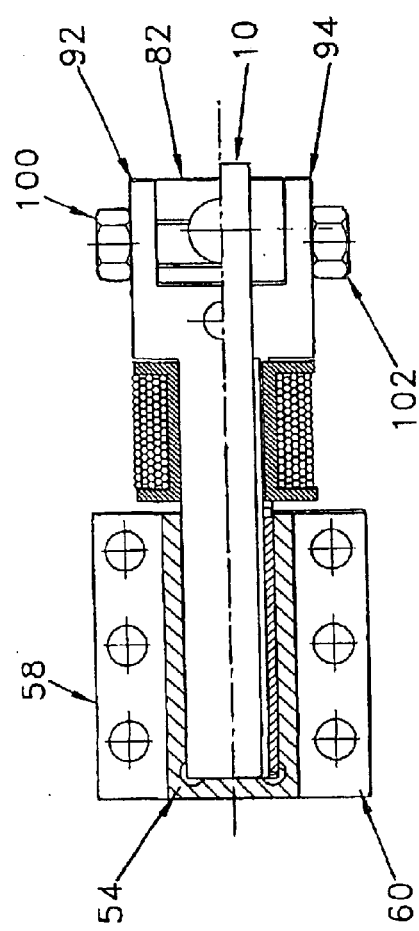
Figure 5:
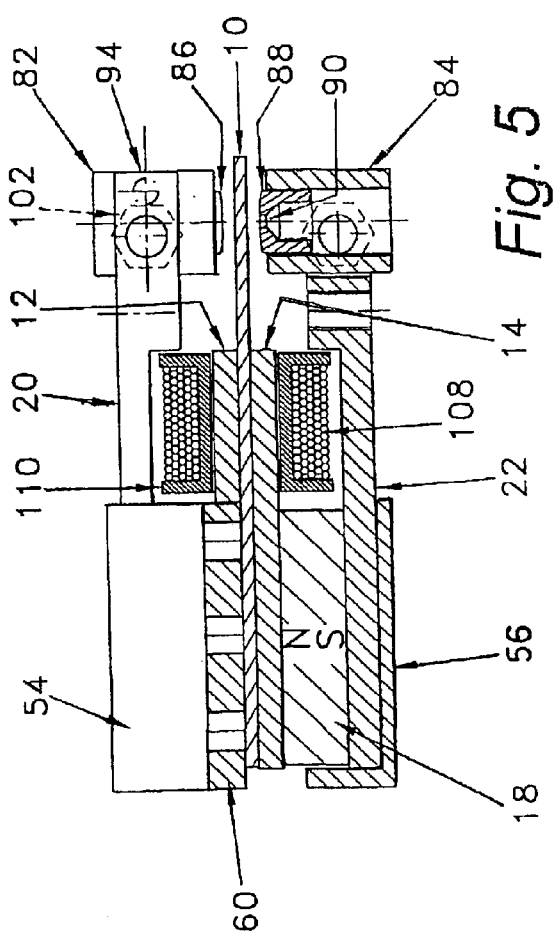

FIGS. 4, 5 and 6 show how the component parts of the schematic arrangement of FIG. 1 could be constructed and secured together in position—although it is to be understood these arrangements are illustrative only and the invention is not limited to the particular forms of construction shown. Thus the sandwich of the two permanent magnets 16, 18 the internal pole pieces 12, 14 and the external magnetic circuit members 20, 22 are secured within a two-part aluminium housing 54, 56 each part of which is similar and includes a tunnel section and two lateral flanges such as 58, 60 (in the case of the upper part 54) and 62, 64 (in the case of the lower part 56).

The flanges are bolted or otherwise secured together as shown best in FIG. 6, and in so doing the two tunnel sections of the housing parts 54, 56 clamp the stacked sandwich of magnets etc.

The elongate thin mild steel armature 10 is itself sandwiched in the middle of the stack as can be seen in FIGS. 5 and 6, and two elongate spacers 66, 68 are provided between the internal faces of the two tunnel sections and the internal pole pieces 12, 14. The spacers are formed from non-magnetic material, preferably soft material such as copper or brass or plastics, to allow for lateral positioning and alignment of the pole pieces 12, 14.

The opposed faces of the pole-pieces which are to engage the upper and lower faces of the armature are partly cut away t form two aligned shallow channels into which the upper and lower parts of the armature cross-section partly fit. In this way alignment of the armature is ensured.

The alignment of the two housing parts 58, 60 is best achieved by close fitting sleeves such as 70, 72 as shown in FIG. 6, which extend through the aligned holes 74, 76 and 78, 80 respectively in the flanges 58 and 62, and 60 and 64. The bolts or other securing devices extend through the sleeves.

It is of course important not to bridge the gap between the permanent magnets 12, 14 and the sleeves should therefore be formed from non-magnetic material such as copper, brass, aluminium or plastics.

At the outboard ends of the external magnetic circuit members 20, 22 are fitted two blocks of magnetisable material such as mild steel 82, 84 which contain through-bores to receive pole-piece inserts 86,88, also of mild steel or other magnetic material.

Each insert 86, 88 is cylindrical and all but closed at the end protruding from the pole-piece, except for a small orifice, only one of which is visible at 90 in FIG. 5. The other insert 86 is constructed in a similar way to 88.

The ends of the members 20, 22 are bifurcated to provide forks 92, 94 (in the case of 20) and 96,98 (in the case of 22) and the blocks 82,84 are a tight fit between the respective forks and secured in place by hexagonal headed bolts such as shown at 100, 102 and 104, 106.

The armature is magnetically polarised to effect changeover from one pole to the other, by energising a coil, some of the windings of which are denoted by reference number 108, wound on by a former 110—best seen in FIG. 5. Connections to the coil are not shown in the drawings.

By using direct current and selecting the direction of current flow through the coil windings 108 so the armature 10 will be polarised N-S from left to right or vice versa. If the permanent magnets 16, 18 are polarised as shown, then block 82 will be a North pole and block 84 will be a South pole. If in that event armature 10 is polarised so that its right hand end (as shown in FIG. 5) is a North pole, then it will be attracted towards block 84, and if polarised as a South pole, it will be attracted towards the other block 82.

Figure 7:
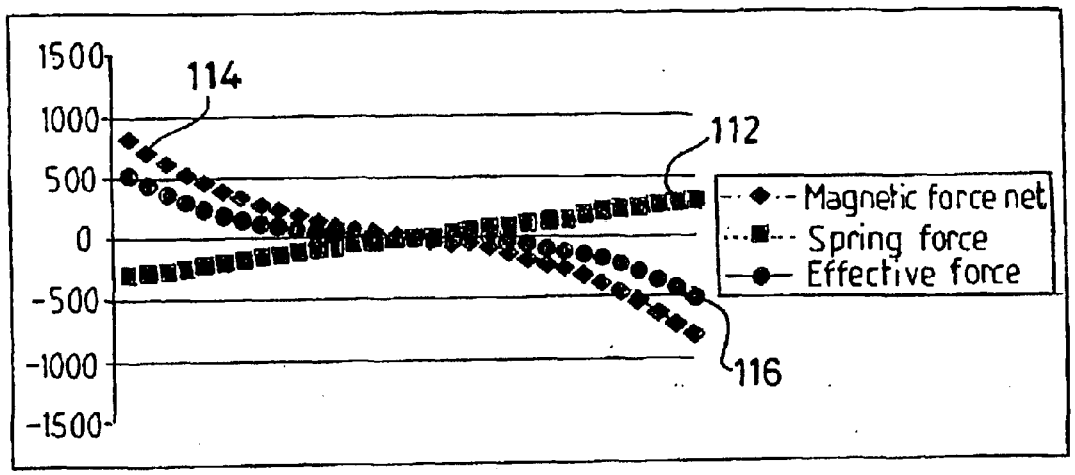
FIGS. 7 and 8 are force diagrams for when the coil current is =0 and >0 for the device shown in FIG. 1.
Figure 8:
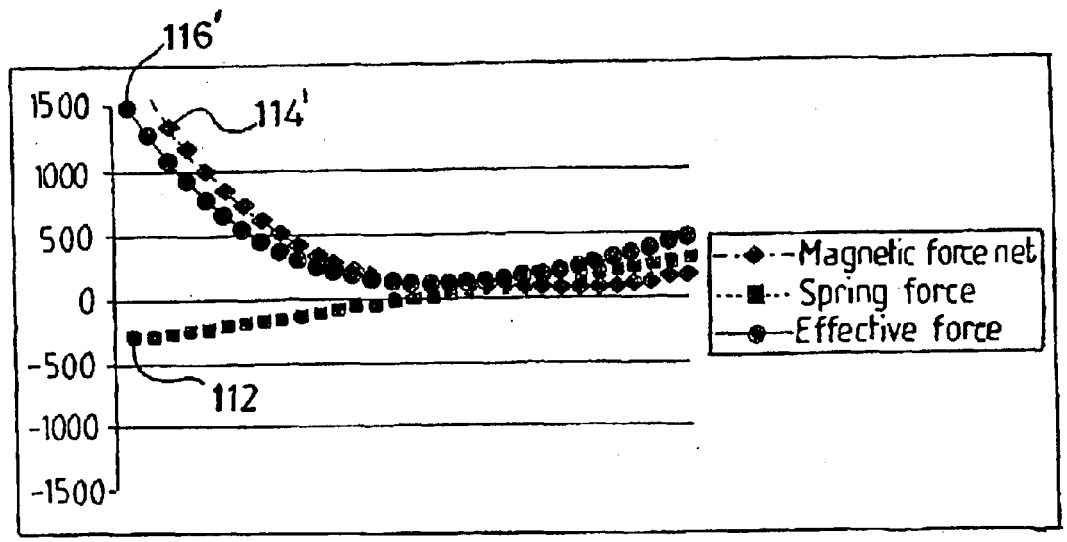

FIGS. 7 and 8 show the variation of the effective force acting on the armature 10—between the pole blocks 82, 84 in the case of the current being zero in FIG. 7 and for the current being >0 in FIG. 8.

In both cases the spring force (resilience) is the same and is denoted by the line of points 112. The net magnetic force acting on the armature is denoted by the line of points 114 and this will be seen to pass through zero in the same way and at the same position as does the spring force curve 112. The net force acting on the armature (magnetic force less spring force) is shown by the line of points 116 and again this passes through zero at the same point as the other two curves, and follows the general shape of the magnetic force curve.

In the case of the current being zero the spring force curve 112 remains the same as in FIG. 7, the magnetic force curve 114' starts at a higher value but never goes below zero and largely flattens out over the second half of the plot. The net force curve 116' is therefore always positive and is sufficient in all cases to overcome the spring force (resilience) of the armature 10, and will cause the latter to be deflected to one of the poles.

If the current is <0 ( ie flows in the opposite sense) then the curve 114' is the mirror image of that shown in FIG. 8, and this time the net force curve will always remain below the zero line, so forcing the armature to be attracted to the other pole.

In FIG. 9 an armature is formed in part from a short strip of resilient material 120 such as phosphor bronze held captive by a fixed mounting 122 so that it will normally extend midway between two pairs of poles 124, 126 and 128, 130 of two pole assemblies 132, 133 respectively. The resilient strip 120 is sandwiched between two longer lengths of flat strip material 134, 135 to form the composite armature assembly. The strips 134, 135 are of magnetisable material, such as silicon steel, and may be cut-away where they are to sandwich the phosphor bronze strip 120 so that the thickness of the latter is accommodated within the two cut-away regions of the strips 134, 135. This refinement is shown in FIG. 9A.

A permanent magnet 136 is mounted between two parallel faces of the two pole assemblies 132, 134 being denoted by 138, 140.

An electromagnet winding 142 on a former 144 surrounds the central region of the armature with connections 146, 148. Energising the electromagnet by direct current flowing in one direction from 146 to 148 will produce a N pole at the left hand end, and a S pole at the right hand end of 144 and this will induce similar magnetic polarity in the armature so that in that event the LH end of 134, 135 between 128, 130 will become a N pole and the RH end between 124, 126 will become a S pole.

Consequent on this polarisation of 134, 135, the composite armature will twist relative to the mounting 122 to enable the LH end to move towards face 128 and the RH end to move towards face 126.

If the current flows in an opposite sense, the LH end of 134, 135 will become a S pole, and the RH end a N pole, and the movement will be reversed, ie the LH end will move towards 130 and the RH end towards 124.

The resilience of the strip 120 and the strength of the magnet 136 are selected so that when deflected either one way or the other, the residual flux linking the adjacent ends of the armature components 134, 135 and the poles 128 (130) and 126 (128) (depending on the last direction of the current in 142), due to the permanent magnet 136, after the current flow in 142 has ceased, is greater than the restoring force exerted on 134, 135 by the twist of 120, relative to 122. The armature will thus remain in that position until an opposite current flows in the winding 142.

It is of course necessary to ensure that the magnetic flux created by the current generates a sufficiently powerful magnet of tile armature components 134, 135 for the forces of attraction and repulsion in the air gaps between 128, 130 at one end, and between 124, 126 and the other, to overcome the stiffness of the resilient strip 120 and fixed mounting 122.

FIG. 10 shows how such an actuator can be enclosed within a housing 150 and the poles defining faces 124, 126 modified, to form fluid flow control valves.

To this end the RH end of the armature assembly forms a valve closure and in its deflected position either closes off a port 152 (and leaves open a port 154) or closes of 154 and opens 152. The ports are formed by sleeves 156, 158 screwed or otherwise secured in bores 160, 162 formed in the pole assemblies 132, 133 respectively. The bores communicate with openings 164, 166 respectively in the wall of the housing 150 and O-ring seals 168, 170 prevent fluid loss between the inside surface of the housing and the pole assemblies 132, 133. Similar O-ring seals 172, 174 are fitted around the inboard ends of the sleeves 156 and 158 respectively, to form a good seal with the face of the armature components 134, 135.

In FIG. 11 a wedge shaped armature 176 is located in a V-shaped seating 178 at one end of the metal core 180 of an electromagnet having a winding 182. At the opposite end of the core 180, two permanent magnets 184, 186 magnetisably polarise two pole piece assemblies 188, 190 N and S respectively. Each assembly includes a main element and a pole-piece 192, 194 respectively each of which extend inwardly to present two pole faces 196, 198 on opposite sides of the V-shaped seating 178, and create an air gap within which the armature operates.

It will be seen that face 196 will be a S pole and face 198 a N pole due to the permanent magnets 184, 186.

If the current through winding 182 causes the armature 176 to become a S pole, it will rock into the position shown. Reversing the current will cause the armature to become a N pole, and it will rock into contact with the other LH face of groove 128.

The region containing the armature is closed by a housing made up of a wall 200 and end cover 202 generally formed from non-magnetic material, so as not to interfere with the magnetic fields acting on the armature.

Between the cover 202 and the armature is located a resiliently deformable spring strip 204, its ends being held captive in a cavity 206 in the cover and in a slot in the armature 176. The resilience of the strip 204 is such as to try and straighten it, so as to provide a restoring force on the armature tending to move it into a position midway between the faces 196 and 198.

The strength of the magnets 184 and 186 is selected so that after the electromagnet is de-energised the residual flux linking the pole face 196 (or 198) with the armature 176 is sufficient to provide a force of attraction greater than the restoring force exerted by the spring. However the flux generated by oppositely energising the electromagnet, is arranged to be such that when combined with the restoring force, the attractive force between the armature and the pole face it is in contact with, is exceeded, and the armature is attracted over to the opposite face This of course is assisted by the force of repulsion which will be created, on current reversal in the winding 182, between the armature and the face it is currently in contact with.

The actuator shown in FIG. 11 can be employed to transfer fluid flow from an inlet at 208 to one or the other of two outlets 210, 212 which communicate with openings in the inclined faces of the V-shaped groove 178 via passages 214, 216. Sealing rings (such as 218) are provided in the cooperating faces of the armature 176, so that when rocked to the right (as shown) the armature sealingly closes off the opening to passage 216 from the chamber 220 leaving the other opening to passage 214. This allows fluid to pass from chamber 220 to outlet 210. With the armature pivoted to the left, the opening to passage 214 will be sealingly closed and the opening to passage 216 will be free, allowing fluid to pass from chamber 220 to outlet 212.

FIGS. 12 and 13 illustrate an alternative actuator which operates in a similar manner to that of FIG. 11 but in which the components are rearranged to improve the magnetic circuit in the region of the armature and to allow the fluid connections to all be at one end. Thus a core of an electromagnet having a winding 224 is straddled by two elongate magnetisable members 226, 228. Permanent magnets 230, 232 are sandwiched between the core and the ends of 226, 228 at one end of the winding, and two pole pieces 234, 236 at the other.

The pole pieces are inclined relative to the axis of the winding to present two mutually inclined faces on opposite sides of a small chamber within which a wedge shaped armature 238 is located between the parallel jaws 240, 242 of an extension to the core 222. Springs 244, 246 extend between the armature 238 and two anchorages 248, 250 which are of non-magnetic material and are screwed into threaded openings in the wall 252 of non magnetic material. This defines a closed chamber 256 with the core at one end and a cover 254 at the other.

Fluid is admissible to chamber 256 via a port 258 and is directed to one of two outlets 260, 262 via passages 264, 266 respectively depending on whether the open end of 264 or 266 is closed by the armature 238. O-rings may be provided in the faces of the armature, in the same way as in FIG. 11, to more securely seal the closed-off passage 264 or 266.

As with the Pig 11 embodiment, the springs are selected so that the centering restoring force acting on the armature is insufficient to overcome the magnetic attraction established by the residual flux linking the armature and the pole 234 or 236, after the current ceases, and the winding 224 and/or current is selected so that when combined with the restoring force exerted by the stretched spring, the armature will rock from one side to the other.

FIG. 14 shows an alternative actuator design in which two wedge shaped armatures 268, 270 are tiltably mounted in V-shaped airgap 272, 274 respectively formed between end faces of two arcuate pole pieces 276, 278 having central radial extensions 280, 282 which are joined by a permanent magnet 284. The resulting magnetic polarity of the faces defining the openings is shown in the drawings.

The armatures are held captive by pairs of springs 286, 288 acting on curvature 268 and 290, 292 acting on curvature 270, and by the engagement of the heel of each armature in a V-shaped shoe 294, 296 respectively.

By sandwiching the assembly between flat plates (not shown) and a cylindrical close fitting sleeve (not shown), two chambers are formed 298, 300. The position of openings in the underside plate which are covered or exposed depending on the position of armature 268 are shown at 302, 304. The positions of similar openings which will be covered or exposed depending on the position of armature 270 are shown at 306, 308. Fluid can be admitted to chambers 298 and 300 via ports (not shown) in the opposite end plate (not shown), so that fluid can be directed to 304 and 306, or 302 and 308 depending on the positions of the armatures.

This is determined by the direction of current flow in an electromagnet comprising a winding 310 and C-shaped core 312 which is located to the side of the assembly of FIG. 14, as shown in FIG. 16.

As shown in FIGS. 16 and 17, the two poles 314, 316 of the core align generally with the shoes 294, 296 and armature 268, 270 so that when energised one connection becomes a N pole and the other a S pole. The polarities are reversed by reversing the direction of current flow.

If the side closure plate (not shown) between the assembly of FIG. 14 and the poles 314, 316 is thin and non-magnetic (eg is formed from a plastics material) the poles 314, 316 do not need to make physical contact with the shoes or armatures. However as shown in FIG. 18 the poles 315, 316 may, to advantage, be extended into the chambers 298, 300 so as to make contact with or form part of the shoes 294, 296. If so, the pole extensions must pass sealingly through any end closure plate (not shown), and the latter conveniently may be moulded Onto the pole extensions during manufacture.

An alternative pivoting arrangement is shown in FIG. 15 which is otherwise similar to FIG. 14, and in order to reveal the passages through the shoes, is shown as a cross section on XX in FIG. 18. Here passages 318, 320 extend through shoe 294 and 322, 324 extend through shoe 296. An O-ring seal is located in a recess at the inboard end of each passage so that when the face of an armature engages the face of the shoe, the inboard end of that passage is sealingly shut-off from the chamber 298 or 300 according to where it is located in the assembly. Fluid introduced into the two chambers can therefore be directed via passages 318 and 324 or, as shown via 320 and 322.

To facilitate transfer of fluid from the passages in the shoes, pipes may extend to the rear of the shoes to communicate with the outboard ends of the passages. More preferably the passages may not extend fully through the shoes but instead may intersect perpendicular passages (not shown) in the shoes which extend to openings in faces of the shoes, which can be aligned with openings in the end closure plates (not shown) which thereby serve as fluid outlets.

FIGS. 19 and 20 show a form of construction for the device of FIG. 14, while FIGS. 22 to 23 show a form of construction for the device of FIG. 15 in which passages in the shoes extend at right angles to those shown in FIG. 15.

As shown, the end closures are arcuate plates 326, 328 instead of circular discs, and quadrant plastics mouldings 330, 332 (see FIG. 20) are inserted into the assembly from one side and the arcuate closures 326, 328 are secured (as by adhesion) to the exposed end faces of the different legs of the mouldings such as 334, 336 of moulding 330 and 338, 340 of moulding 332.

One of ports 302–308 is shown at 304 in FIG. 20, the other three being obscured from view. Pipes 342, 344, 346 and 348 (shown in FIG. 20) extend from the base plates 350, 352 of the mouldings, the upper ends of the pipes connecting with ports 302–308 respectively.

The cylindrical wall segments 354, 356 of each moulding 330, 332 is cutaway internally to define an annular gap 358, 360 between its inside wall surface and the outer face of each of the wedge shaped armatures 268, 270. An inlet port is provided in each wall 354, 356, only the port in 354 being visible in FIGS. 19 and 20. This is denoted by reference numeral 367.

Fluid supplied to 362 will pass out through 302 and pipe 342 (or 304 and pipe 344) depending on the position of 268. Likewise fluid entering the region 360 will exit via pipes 346 (or 348) depending on the position of 270.

The plates 326 and 328 may include a transparent window (such as 364 in 328), which aligns with the armature 270, and the latter may have two differently coloured segments (such as 366 and 368 on 270) which will alternately appear in the window depending on the displacement of the armature. Both armatures may be similarly marked and a second window provided if desired.

FIGS. 21, 22 and 23 illustrate a valve construction embodying the actuator of FIG. 15. Here the ports, which are opened and closed by movement of an armature, are formed in the internal inclined faces of a V-shaped insert or shoe (made from magnetic material), denoted by reference numerals 370, 372 in FIGS. 15 and 22, 23. Each port communicates with a narrow bore such as 374 (see FIG. 23) and a circular rebate 376 surrounds the bore opening 374 into which is fitted a rubber O-ring seal 378. The seals protrude slightly from the faces of the shoe insert (itself 380 in the case of seal 378) so that when the armature is displaced towards that face, a good seal is made between the face and the insert. In this way the bore 374 is completely closed off from the interior of a chamber within the housing made up of inner part 376, base 378, outer wall 380 and removable upper plate 382 which is sealed to the upper faces of 370 and 380 to create the closed housing, which is generally designated 384 in FIG. 21. The interior of the housing can be accessed via inlet port 386 and fluid can leave it via outlet ports 388, 390.

A similar chamber is created for the outer armature 384' by another moulding 376' with base 378', outer wall 380' and closure 382', having outlets 388' and 390' and an inlet (not visible) in the outer wall 380'.

Each moulding 376, 376' includes intermediate regions such as 392, 394 (see FIGS. 22 and 23) between the V-shaped shoes 370, 372 and the N, S poles at the ends of the curved pole pieces 276, 278. The opposed faces of the intermediate regions have openings, one of which is visible in FIG. 23 and is denoted by reference numeral 396. Springs 286-292 extend from the openings and are anchored at their inner ends by pins located in perpendicular bores 398 (in the case of opening 396) and 400, 402 and 404 in the case of the other openings (not shown) in the inner faces of the other intermediate regions 394, 406 and 408.

The outlets 388, 390 communicate with ports 410, 412 in 370 (and 410', 412' in 372), each of which communicates by two perpendicular drillings with openings such as 374 in the inner faces of the shoes 370, 372. Part of one of the vertical drillings is shown in the cutaway region in FIG. 23 at 414.

Like the FIGS. 14, 19 and 20 arrangement, the chamber associated with armature 384 is sealed from, and is quite separate from, the chamber associated with armature 384', so that fluid flow from 386 to either of outlets 388, 390 is quite independent of flow from the other inlet to the outlets 388', 399'.

In each arrangement illustrated in FIGS. 19, 20 and FIGS. 21, 23 respectively, the electromagnet assembly is assumed to be as shown in and described with reference to FIG. 18.

FIGS. 24-27 illustrate another valve assembly operated by an actuator embodying the invention, and to assist in understanding the remaining Figures, reference is first made to the perspective views of FIGS. 26 and 27.

The actuator includes a winding 416 on a former 417 of an electromagnet having an E-shaped core made up of a central pole piece 418, upper and lower pole pieces 420, 422 and two permanent magnets 424, 426 arranged i.e. with N and S poles in contact with the central pole piece 418, and extending between it and the upper and lower pole pieces 420, 422.

The ends of the poles 418, 420 and 422 are similarly apertured at 428, 430, 432 respectively, and the three openings are aligned (as best seen in FIG. 27). A cylindrical sleeve of non-magnetic material 434 is fitted through and secured in position in the aligned openings, and a movable armature member (not shown in FIGS. 26, 27) is slidable within 434. Movement of the armature member in one sense enables fluid supplied under pressure at the lower end of sleeve 434 to pass into a reservoir 436 via a port 438. The latter is surrounded by an O-ring seal 440 to improve sealing between the port and the interior of the reservoir. Movement in the opposite sense blocks off communication between the reservoir 436 and the sleeve 434, to establish communication between the reservoir and the interior of a cylindrical manifold 442 to allow fluid to pass from the reservoir to port 444 at the upper end of 442, which is conveniently connected to a pipe (not shown) for conveying fluid to a receptor. The reservoir includes an integral sleeve 446, which is a close fit over the manifold 442.

The valve is of particular value in the field of medicine where accurate volumes of gas, air, or a liquid are to be delivered to a patient e.g. for intravenous injection at intervals during a treatment programme. It has the advantage that the sleeve 434 and manifold 444 may be removed and replaced for sterilising, or replacement, for use with another patient.

If desired the reservoir likewise can be removed for sterilisation, and/or replacement, or the sleeve and reservoir can be constructed as a single sterilisable or non-re-usable unit.

The inner working of the actuator and valve is best seen by considering FIGS. 24 and 25. This reveals the lower fluid connection (inlet) 448 and the slidable magnetisable armature. This is made up of a central elongate cylindrical pin 450 of magnetisable material, the mid region of which is of greater diameter than the pin to form a cylindrical enlargement 452 which includes a plurality of axially parallel bores 454 through which fluid can flow from one end of the enlargement 452 to the other.

The pin 450 includes annular stops 456, 458 shortly before the upper and lower ends of the pin. These two ends beyond the stops provide spigots for two compression springs 460, 462. Ignoring magnetic forces on the armature, the springs 460, 462 will normally centre the pin between two annular stops 464, 466 provided by the inboard ends of two cylindrical liners 468, 470 fitted into and secured in the opposite ends of the cylindrical bore 434 and manifold 442. The enlarged diameter mid-region 452 of pin 450 is a free sliding fit in the base 434.

The spigots protrude through the annular stops 464 and 466 (depending on the direction in which the pin 450 has been displaced) and in doing so will dislodge a ball 472 at the upper end or a ball 474 at the lower end. The balls are urged axially towards the opposite faces of the respective annular stops by two further springs 476 and 478, held captive at their outboard ends by Circlips™ 478 and 480.

The stops 464 and 466 serve as valve seatings against which the balls 473, 474 sealingly engage under the force of the springs 476, 478 so that when not axially displaced by a n armature spigot seal ball will prevent local flow in an upward sense in FIG. 24.

The action of the electromagnet is to force the outboard end of the central core 418 either S (or N) (depending on the direction of current flow) and this in turn causes the pin 450 to become magnetically polarised either S (or N) so causing it to be attracted to pole piece 422 (or 420).

As shown, the pin has last been magnetised as a N pole, so has moved upwardly displacing ball 472 and opening the passage between the reservoir 436 and the outlet 444.

The strength of the magnets 424, 426 and the restoring forces of the springs acting on the pin, are selected so that even after the current ceases to flow in 416, the flux linking the pin and the pole piece 420 is sufficient to hold the pin in the position shown.

A pulse of current in the opposite sense will shift 456 in the appropriate direction to displace ball 474 and cause ball 472 to move back and close off access to 444. Movement of the ball 474 oft seat 466 allows fluid at the inlet to pass into the bore 434, and if its pressure is greater than that of fluid remaining in the reservoir 436, fluid will continue to flow into the bore and reservoir until the pressures are equalised.

Another opposite pulse of current, moving armature pin 450 in an upward sense as shown, will close off the inlet 448 from 434 and allows the charge of fluid in 434 and 436 to discharge out through 444.

If the pressure at 448 is maintained constant, the bore 434 and reservoir 436 will be filled with the same volume of fluid each time the ball 478 is depressed clear of 455. If the pressure at the receptor (supplied from 444) is substantially constant, a constant volume of fluid will be delivered to the receptor each time ball 472 is lifted off 464. The valve is thus capable of delivering pulses of fluid of substantially constant volume (provided source and receptor pressures remain substantially constant).

What is claimed is:

1. An electromagnetically operable device comprising:
   (a) a magnetic circuit having permanent N and S poles defining an air gap;
   (b) an armature assembly which extends into the air gap and at least a portion of which is magnetisable and is movable between two end positions adjacent the two permanent poles through an intermediate position towards which it is resiliently biased; (and)
   (c) an electromagnet which when energised by an electric current polarises the magnetisable portion of the armature assembly so that the part thereof in the air gap becomes a S or N pole and will thereby be attracted towards, one of the permanent poles, and
   (d) two springs each of which extends between the armature and one of the two permanent poles, which in the absence of other forces would position the armature in its said intermediate position;
   wherein the residual permanent flux linking the magnetic part of the armature assembly and the relevant adjacent permanent pole after a current of a given magnitude and direction has flowed in the electromagnet and displaced the armature, is sufficient to generate a force of attraction which is greater than the resilient spring force acting to return the armature to its intermediate position so as to retain the armature in its displaced position, but which is less than the sum of the resilient spring force and the force of attraction created by the magnetic flux linking the magnetic part of the armature assembly and the other permanent pole, when a similar current, but flowing in the opposite direction, flows in the electromagnet, so as to impart a bistable characteristic to the device.

2. A device as claimed in claim 1, wherein the armature assembly is formed in part from a length of resilient material and the resilient force is generated by deflecting the resilient material from an undeflected condition, to one side or the other.

3. A device as claimed in claim 1, wherein an opening is provided in at least one of the poles which is covered by the armature when the latter is attracted to it, and opened when the armature either occupies its intermediate position or is attached to the other pole, whereby movement of the armature controls the flow of a fluid (liquid or gas) through the opening.

4. A device as claimed in claim 3, wherein there is also an opening in the other pole, and this other opening is covered by the armature when it is attracted to this said other pole.

5. A device as claimed in claim 1, further comprising a device for increasing the air gap between the armature and one of the pole faces, so that when a current flows through the electromagnet which would have attracted the armature to that pole, the residual flux linking the armature and that pole is insufficient to overcome the resilient biasing of the armature so that the armature is only attracted to that pole while the current flows.

6. A device as claimed in claim 1, wherein the size of the air gap between the armature and each of the poles is adjustable to enable the balance of the magnetic circuit to be adjusted, as by way of a movable insert which may be magnetisable and which can be adjusted so as to protrude to a greater or lesser extent from a pole face.

7. A device as claimed in claim 1, adapted to be linked to a parameter sensing device, which is adapted to adjust the position of one pole or a part thereof relative to the mid position of the armature, so as to increase the distance between the armature and that pole if the parameter sensed by the sensing device exceeds a predetermined value.

8. A device as claimed in claim 1, wherein the armature assembly is slidable in a guide between the two end positions it can adopt depending on the direction in which the current last flowed in the electromagnet, and the latter has a core which is magnetically coupled to the magnetisable part of the armature assembly.

9. A device as claimed in claim 8, wherein the core extends into the air gap between the permanent N and S poles and at least in part surrounds a movable and magnetisable part of the armature assembly.

10. A device as claimed in claim 8, wherein movement of the or each armature assembly (or part thereof) covers or uncovers openings, so as to permit or impede a fluid flow, to thereby form a fluid flow control valve.

11. A fluid flow control valve having at least one inlet and at least one outlet comprising an electromagnetically operated device as claimed in claim 1, wherein the movable armature acts on or comprises at least part of a movable device for controlling the flow of fluid from the inlet to the outlet.

12. A valve is claimed in claim 11, having one inlet and two outlets, or two inlets and one outlet.

13. An electromagnetically operable device comprising:
(a) a magnetic circuit having permanent N and S poles defining an air gap;
(b) an armature assembly which extends into the air gap and at least a portion of which is magnetisable and is movable between two end positions adjacent the two permanent poles through an intermediate position towards which it is resiliently biased; and
(c) an electromagnet which when energised by an electric current polarises the magnetisable portion of the armature assembly so that the part thereof in the air gap becomes a S or N pole and will thereby be attracted towards one of the permanent poles,
wherein the armature assembly comprises a wedge of magnetisable material which is located in a V-shaped gap between two faces of magnetisable material which are permanently magnetised as N and S poles, the included angle of the armature wedge being less than the angle between the two faces of the V-shaped gap, so that the armature can rock in the gap between two end positions, one in which it engages a face at one end of the gap and the other in which it engages a face at the other end of the gap, (a) spring means acts on the wedge to bias it into a mid-position between the two faces, and the electromagnet is coupled to the armature to cause the armature to become a N or S pole so that it is attracted to one and repelled from the other of the two faces defining the gap.

14. A device as claimed in claim 13, wherein two permanent magnets are arranged in series with a block of magnetisable material sandwiched between the inboard N pole of one and the inboard S pole of the other, and pole pieces extend from the outboard S pole of the one, and the outboard N pole of the other magnet, to define the S and N poles of the gap, and the electromagnet generates a flux which links the block of magnetisable material between the two magnets and the wedge shaped armature.

15. A device is claimed in claim 13, wherein a single permanent magnet is employed, arranged transversely and symmetrically relative to the mid-position of the armature wedge, with pole pieces extending therefrom to define the V-shaped air gap, and the electromagnet is arranged with its magnetic axis transverse to that of the permanent magnet.

16. A device as claimed in claim 15, wherein pole pieces are arranged to extend symmetrically in opposite directions from the ends of the single permanent magnet, to define two V-shaped air gaps, back to back, on opposite sides of the permanent magnet, and two wedge shaped armatures are provided, one in each gap and each pivotable in the gap as described above, and the electromagnet has pole pieces which influence the two armatures so that if one is a N pole the other will comprise a S pole.

* * * * *